US012518339B2

(12) United States Patent
Urra et al.

(10) Patent No.: US 12,518,339 B2
(45) Date of Patent: Jan. 6, 2026

(54) CENTRAL PROCESSING UNIT TRANSLATION OF IDENTIFIERS FOR CAPTURED GRAPHICS WORKLOADS

(71) Applicant: ADVANCED MICRO DEVICES, INC., Santa Clara, CA (US)

(72) Inventors: Rodrigo Andres Urra, Powell, OH (US); David Elias Donaldson, Nevada City, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 197 days.

(21) Appl. No.: 18/374,293

(22) Filed: Sep. 28, 2023

(65) Prior Publication Data

US 2025/0111460 A1    Apr. 3, 2025

(51) Int. Cl.
*G06T 1/20*    (2006.01)
*G06T 1/60*    (2006.01)

(52) U.S. Cl.
CPC .................. *G06T 1/20* (2013.01); *G06T 1/60* (2013.01)

(58) Field of Classification Search
CPC .................................. G06T 1/20; G06T 1/60
USPC ........................................................ 345/522
See application file for complete search history.

(56) References Cited

U.S. PATENT DOCUMENTS

| 11,567,555 | B2* | 1/2023 | Kim | G06F 9/30043 |
| 11,868,263 | B2* | 1/2024 | Favor | G06F 3/0626 |
| 2015/0301841 | A1* | 10/2015 | Mackintosh | G06F 8/52 |
| | | | | 717/136 |
| 2020/0028935 | A1* | 1/2020 | Sahay | G06F 9/5088 |
| 2021/0049015 | A1* | 2/2021 | Chou | G06F 9/30043 |
| 2023/0217253 | A1* | 7/2023 | Palermo | G06F 9/505 |
| | | | | 726/23 |
| 2023/0305992 | A1* | 9/2023 | Dutta | G06F 9/322 |
| 2023/0325321 | A1* | 10/2023 | Helmick | G06F 12/1027 |
| 2023/0334614 | A1* | 10/2023 | Livesley | G06T 15/005 |

* cited by examiner

*Primary Examiner* — David T Welch

(57) ABSTRACT

To help enable the faster translation of identifiers during the replay of a captured workload, a processor is configured to generate and insert one or more translation commands into the captured workload. To this end, the processor includes one or more processor cores configured to capture a workload that includes graphics calls referencing an identifier stored in a memory object of a processing unit. Based on the graphics calls referencing the identifier stored in a memory object of a processing unit, the processor cores generate a translation command that includes instructions configured to translate the identifier stored in a memory object of a processing unit to a runtime identifier. After generating the translation command, the processor cores then insert the generated translation command in the captured workload at a location based on the graphics calls referencing the identifier.

20 Claims, 4 Drawing Sheets

CENTRAL PROCESSING UNIT TRANSLATION OF IDENTIFIERS FOR CAPTURED GRAPHICS WORKLOADS

BACKGROUND

To render graphics objects for a scene, some processing systems are configured to execute one or more rendering applications. These rendering applications, for example, include workloads indicating graphics calls and instructions to be performed by a processing system so as to render the graphics objects. To help optimize and debug a rendering application, these processing systems are configured to capture one or more workloads of the rendering application as they are being performed. That is to say, a processing system is configured to store data representing the workloads in memory as the workloads are being performed by the processing system. The processing systems then modify and replay the captured workloads so at to generate data used to optimize or debug the rendering applications.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
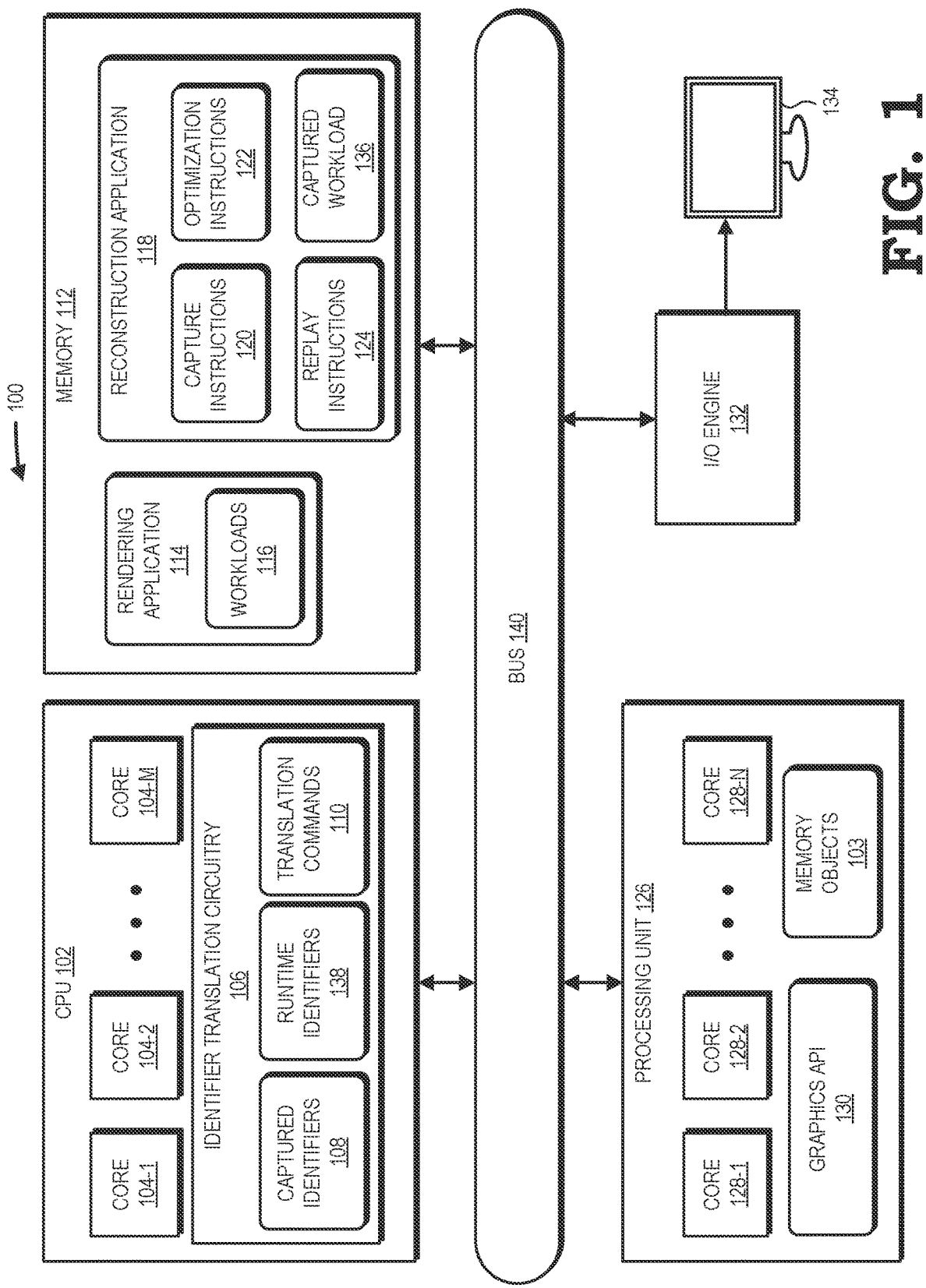
FIG. 1 is a block diagram of a processing system configured to translate identifiers of a captured workload, in accordance with some embodiments.

Some processing systems are configured to render graphics objects for a scene according to one or more rendering applications. These rendering applications each include program code that indicates one or more workloads to be performed by one or more processing units of a processing system. To help perform these workloads, one or more processing units of a processing system are configured to support a graphics application programming interface (API) that enables the processing unit to perform one or more instructions of one or more workloads for a rendering application. As an example, based on a graphics API, the processing system uploads data indicating one or more graphics calls of the workload to be executed to one or more buffers. From these buffers, the processing unit receives the data and then executes the graphics calls indicated in the data. Such graphics calls, for example, include groups of instructions that, when executed by a processing unit, cause the processing unit to perform one or more functions for rendering a graphics object. By executing the instructions of one or more graphics calls of a workload, the processing unit renders one or more graphics objects for a scene.

To help optimize or debug the rendering applications, some processing systems are configured to capture one or more workloads as they are performed by the processing unit. That is to say, some processing systems store data indicating the graphics calls associated with one or more workloads performed by the processing unit. To capture a workload, a processing system is configured to execute a reconstruction application. This reconstruction application, for example, includes program code indicating capture instructions, optimization instructions, and replay instructions to be performed by a central processing unit (CPU) of the processing system, a processing unit of the processing system, or both. To execute the reconstruction application, the CPU of the processing system first performs the capture instructions of the reconstruction application. While performing the capture instructions, the CPU is configured to capture a workload performed by the processing unit by storing data representing one or more graphics commands indicated in the workload in one or more memory blocks. These stored graphics commands, for example, include graphics calls that reference one or more respective identifiers each associated with the execution of the graphics call. Such identifiers, for example, include different forms of pointers that represent different components of a rendered scene such as virtual memory addresses, shader identifiers, descriptor handles, and the like. Additionally, these identifiers, for example, are stored in one or more memory objects (e.g., regions of virtual memory) of the processing system. After capturing one or more workloads, the CPU then performs the optimization instructions of the reconstruction application. During the performance of the optimization instructions, the CPU modifies or adds one or more instructions, graphics calls, or both of the captured workloads so as to reduce the time needed for the processing unit to perform the captured workloads, reduce the processing unit resources needed to perform the captured workloads, or both. After the CPU has performed the optimization instructions, the CPU then performs the replay instructions of the reconstruction application. While performing the replay instructions, the CPU provides one or more graphics calls of the stored workload to the processing unit which in turn performs the graphics calls to render one or more graphics objects.

Because the identifiers referenced by the graphics calls are stored as raw data within memory objects of the processing system, these memory objects are likely to change from the capture of the workload to the replay of the captured workload including the identifiers. To this end, the CPU is further configured to translate the respective identifiers referenced by one or more corresponding graphics calls of a captured workload before a graphics call is sent to the processing unit. That is to say, for example, the CPU is configured to update the memory objects of the processing system storing the respective identifiers referenced by one or more corresponding graphics calls such that the graphics calls are able to reference the identifiers during the execution of the replay instructions. However, if an identifier referenced by a graphics call resides (e.g., is stored) within a memory object of the processing unit, the CPU first issues one or more translation calls to the processing unit so that the identifiers are translated before the graphics call is performed by the processing unit. These translation calls, for example, include instructions that, when performed by the processing unit, CPU, or both cause the processing unit, CPU, or both to translate the identifiers contained within memory objects of the processing unit that will be used to perform the graphics call of the captured workload. As an example, a translation call first includes the processing unit stopping a current workload (e.g., stalling). The translation call then includes the processing unit providing data (e.g., the contents) of a memory object of the processing unit including one or more identifiers. The CPU then translates the identifiers by, for example, updating the data of the memory object such that the identifiers are able to be referenced by one or more graphics calls during the replay of the captured workload. Further, the CPU then provides the updated data to the processing unit. Once one or more translation calls have been performed by the CPU, processing unit, or both, the CPU then provides the graphics call to the processing unit. After the processing unit performs one or more received graphics calls, the graphics objects are again rendered and data is collected to optimize or debug the rendering applications. In this way, the processing system replays one or more workloads previously performed by the processing unit in order to help optimize or debug the rendering applications associated with the workloads.

However, because a translation call includes the processing unit stalling a current operation while the CPU downloads, updates, and uploads the data of a memory block of the processing unit, these translation calls introduce a delay before the processing unit is able to begin execution of a captured graphics call or workload. This delay, for example, increases the amount of time needed for the processing unit to perform a captured workload and decreases processing efficiency. Additionally, issuing a translation call to the processing unit increases the number of download and upload operations the processing unit must perform when performing a captured workload, which again reduces processing efficiency. As such, systems and techniques disclosed herein are directed to translating identifiers stored within memory objects of the processing unit at the CPU when a captured workload is performed. To this end, the CPU is configured to first perform the capture instructions of the reconstruction application such that one or more workloads are captured and stored in one or more memory blocks of the memory. After one or more workloads are stored, the CPU then performs the optimization instructions of the reconstruction application.

While performing the optimization instructions, the CPU is configured to perform two passes on one or more captured workloads in order to enable the faster translation of identifiers stored in memory objects of the processing unit during the replay of a captured workload. During the first pass, the CPU processes (e.g., executes) and analyzes the captured workload. While the CPU processes the captured workload, the CPU also tracks the locations of the identifiers stored in memory objects of the processing unit. That is to say, the CPU identifies which identifiers are stored in memory objects of the processing unit during the execution of the captured workload. For example, while the CPU is processing the captured workload, the CPU determines whether a graphics call being executed references an identifier stored in a memory object of the processing unit. If the graphics call does reference an identifier stored in a memory object of the processing unit, the CPU then tracks the location of the identifier within the memory object of the processing unit. To track the location of the identifier, the CPU determines an offset value based on the location of the identifier in the memory object. Such an offset value, for example, indicates the location of an identifier stored within a memory object of the processing unit. Additionally, the CPU determines which command of the captured workload caused the identifier to be uploaded for the processing unit. That is to say, the CPU determines which command caused the CPU to upload data including the identifier for the processing unit. Further, during the first pass, the CPU determines a timing for each identifier stored in a memory object of the processing unit. These timings, for example, each represent a point within a captured workload when an identifier stored in a memory object of the processing unit is copied to another memory object of the processing unit. In this way, after the first pass, the CPU identifies one or more graphics calls referencing identifiers stored in a memory object of a processing unit, one or more offsets associated with the identifiers, one or more commands that uploaded data including the identifiers for the processing unit, and one or more timings associated with the identifiers.

During a second translation pass, the CPU generates and inserts one or more translation commands into the captured workload based on the referenced identifiers stored in a memory object of a processing unit, one or more offsets associated with the identifiers, one or more commands that uploaded the identifiers for the processing unit, and one or more timings associated with the identifiers. Each translation command, for example, prepares a subsequent command configured to upload data including the identifiers for the processing unit. That is to say, the translation command modifies a subsequent command configured to upload the parent memory object of an identifier so as to translate the identifiers. As an example, the CPU first generates a translation command for an identifier stored in a memory object of the processing unit based on an associated offset. The CPU then inserts the generated translation command for the identifier in the captured workload at a location based on the identified command configured to upload the identifier for the processing unit. As an example, the CPU inserts the generated translation command immediately before a block including the identified command configured to upload the identifier for the processing unit. These translation commands, for example, include instructions that, when performed by the CPU, enable the CPU to translate one or more identifiers stored in the memory object of the processing unit from captured identifiers (e.g., identifiers used when the workload was first performed by the processing unit) to runtime identifiers (e.g., identifiers used when the workload is subsequently performed by the processing unit) before they are uploaded for the processing unit.

After performing both translation passes, the CPU performs the replay instructions of the reconstruction application. While performing the replay instructions, the CPU translates captured identifiers in the captured workload to runtime identifiers based on the translation commands inserted into the captured workload. The CPU then uploads data including the runtime identifiers and one or more graphics calls to the processing unit. Using the runtime identifiers, the processing unit performs the graphics call to render the graphics objects. In this way, the CPU is configured to translate identifiers stored in a memory object of the processing unit without introducing a stall at the processing unit. For example, rather than download and update the contents of a memory object from the processing unit during replay of the captured workload, the CPU is configured to translate identifiers stored in the memory object before the identifiers are uploaded for the processing unit. Because the translations are done by updating the identifiers before they are uploaded for the processing unit, no stall or delay is introduced at the processing unit which reduces the time needed to perform the captured workload and helps to improve the processing efficiency of the system.

Referring now to FIG. 1, a processing system 100 configured to translate captured identifiers is presented, in accordance with some embodiments. The processing system 100 includes or has access to a memory 112 or other storage component implemented using a non-transitory computer-readable medium, for example, a dynamic random-access memory (DRAM). However, in implementations, the memory 112 is implemented using other types of memory including, for example, static random-access memory (SRAM), nonvolatile RAM, and the like. According to implementations, the memory 112 includes an external memory implemented external to the processing units implemented in the processing system 100. The processing system 100 also includes a bus 140 to support communication between entities implemented in the processing system 100, such as the memory 112. Some implementations of the processing system 100 include other buses, bridges, switches, routers, and the like, which are not shown in FIG. 1 in the interest of clarity.

According to embodiments, processing system 100 is configured to render one or more graphics objects for a scene by executing one or more rendering applications 114. A rendering application 114, for example, includes program code including one or more workloads 116 each indicating one or more instructions that, when performed by central processing unit (CPU) 102, processing unit 126, or both of processing system 100 cause one or more graphics objects to be rendered for a scene. After these graphics objects are rendered, for example, processing system 100 displays the graphics objects on display 134. As an example, a rendering application 114 includes a gaming application configured to render one or more graphics objects in a screen space so as to form a virtual environment. To support the execution of a rendering application 114, processing unit 126 is configured to support one or more graphics application programming interfaces (APIs) 130. These graphics APIs 130 are configured to facilitate communication between the hardware of processing unit 126 and a rendering application 114 and include, for example, DirectX APIs, Mantle APIs, Vulkan APIs, OpenGL APIs, or any combination thereof. In embodiments, one or more graphics APIs 130 are configured to support one or more graphics calls. A graphics call includes one or more instructions that, when executed by processing unit 126, cause processing unit 126 to perform a function for rendering one or more graphics objects, for example, draw functions, pipeline functions, ray tracing functions, shading functions, or any combination thereof, to name a few. As an example, a graphics call includes a draw call, state-setting call, ray tracing call, or any combination thereof, to name a few.

In embodiments, based on the graphics API 130 supported by processing unit 126, one or more workloads of a rendering application 114 include one or more graphics calls. That is to say, one or more workloads 116 of a rendering application 114 each includes groups of instructions that each form a respective graphics call. To execute a rendering application 114 including workloads 116 with one or more graphics calls, CPU 102 is configured to upload data indicating one or more graphics calls for processing unit 126. For example, CPU 102 is configured to store data indicating one or more graphics calls in a queue, buffer, memory 112, or any combination thereof and make the stored data available to processing unit 126. Processing unit 126 then receives the data indicating the graphics calls and performs the graphics calls, for example, to render one or more graphics objects. To perform these graphics calls, processing unit 126 includes, for example, vector processors, coprocessors, graphics processing units (GPUs), general-purpose GPUs (GPGPUs), accelerated processing units (APUs), non-scalar processors, highly parallel processors, artificial intelligence (AI) processors, inference engines, machine learning processors, other multithreaded processing units, scalar processors, serial processors, or any combination thereof. Further, to help perform the graphics calls indicated in a workload 116, processing unit 126 includes one or more processor cores 128 configured to perform, concurrently or in parallel, one or more instructions, operations, or both indicated in a graphics call. After performing one or more instructions, operations or both indicated in a graphics call, a processing unit 126 is configured to store the results (e.g., data resulting from the performance of the instruction or operation) in memory 112. According to implementations, one or more processor cores 128 operate as single instruction, multiple data (SIMD) units that perform the same operation on different data sets. As an example, one or more processor cores 128 each operating as SIMD units concurrently perform the same operation on different data sets. Though in the example implementation illustrated in FIG. 1, three processor cores (128-1, 128-2, 128-N) are presented representing an N number of cores, the number of processor cores 128 implemented in processing unit 126 is a matter of design choice. As such, in other implementations, processing unit 126 can include any number of processor cores 128.

In embodiments, to help perform one or more workloads 116 of a rendering application 114, processing system 100 also includes CPU 102 that is connected to the bus 140 and therefore communicates with processing unit 126 and the memory 112 via the bus 140. CPU 102 implements a plurality of processor cores 104-1 to 104-N that execute instructions concurrently or in parallel. In implementations, one or more of the processor cores 104 operate as SIMD units that perform the same operation on different data sets. Though in the example implementation illustrated in FIG. 1, three processor cores (104-1, 104-2, 104-M) are presented representing an M number of cores, the number of processor cores 104 implemented in CPU 102 is a matter of design choice. As such, in other implementations, CPU 102 can include any number of processor cores 104. In some implementations, CPU 102 and processing unit 126 have an equal number of processor cores 104, 128 while in other implementations, CPU 102 and processing unit 126 have a different number of processor cores 104, 128. The processor cores 104 execute instructions for one or more applications stored in the memory 112, for example, one or more rendering applications 114, reconstruction applications 118, or both. After executing these instructions, CPU 102 stores information in the memory 112 such as the results of the executed instructions.

According to embodiments, to help optimize or debug one or more rendering applications 114 executing on processing system 100, processing system is configured to execute reconstruction application 118. Reconstruction application 118, for example, includes program code having one or more instructions that, when executed by processing system 100 (e.g., CPU 102, processing unit 126), cause the processing system 100 to capture (e.g., store) one or more workloads 116 of a rendering application 114 being performed by processing unit 126, optimize the captured workload 136, and replay (e.g., perform) the optimized captured workload 136. To this end, reconstruction application 118 includes capture instructions 120, optimization instructions 122, and replay instructions 124. According to embodiments, while processing unit 126 is performing one or more instructions for one or more graphics calls of a workload 116, CPU 102 is configured to perform capture instructions 120. These capture instructions 120, when performed by CPU 102, cause CPU 102 to capture the workload 116 being performed by processing unit 126. For example, CPU 102 copies the workload 116 provided from rendering application 114 and stores the copied workload in memory 112 to produce captured workload 136. As an example, CPU 102 copies the data indicating one or more graphics calls, instructions, or both of a workload 116 into one or more memory blocks of memory 112. Captured workload 136, for example, includes data representing one or more graphics calls, instructions, or both of a workload 116 of a rendering application 114 being performed by or previously performed by processing unit 126. As an example, in embodiments captured workload 136 includes one or more graphics call blocks that each include memory blocks storing data indicating one or more graphics calls to be executed. Further, captured workload 136 includes one or more upload blocks each associated with one or more corresponding graphics call blocks. Each upload block, for example, includes a command that causes CPU 102 to upload data (e.g., identifiers) to be used by the graphics calls indicated in one or more associated graphics call blocks.

After storing captured workload 136 in memory 112, CPU 102 is configured to perform the optimization instructions 122 of reconstruction application 118. The optimization instructions 122, when performed by CPU 102, cause CPU 102 to modify, add, or both one or more graphics calls, instructions, or both of captured workload 136. As an example, when performing optimization instructions 122, CPU 102 is configured to modify, add, or both one or more instructions of captured workload 136 so as to reduce the time needed for processing unit 126 to perform capture workload 116, reduce the number of resources (e.g., registers, processing units, memory) of processing unit 126 needed for processing unit 126 to perform captured workload 136, or both. In embodiments, after performing optimization instructions 122, CPU 102 performs the replay instructions 124 of reconstruction application 118. When performed by CPU 102, the replay instructions 124 cause CPU 102 to upload one or more graphics calls, instructions, or both of captured workload 136 (e.g., captured workload 136 as modified by optimization instructions 122) to processing unit 126. For example, CPU 102 stores one or more instructions, graphics calls, or both of captured workload 136 in one or more queues, buffers, portions of memory 112, or any combination thereof where the instructions and graphics calls are made available to processing unit 126. Processing unit 126 then executes the instructions and graphics calls of captured workload 136 (e.g., captured workload 136 as modified by optimization instructions 122) to render one or more graphics objects and generate data used to optimize or debug a rendering application 114. In this way, processing system 100 is configured to replay (e.g., again execute) one or more workloads 116 of rendering application 114 in order to help optimize, debug, or both rendering application 114.

In some embodiments, one or more instructions, graphics calls, or both of a captured workload 136 reference one or more identifiers. Such identifiers (e.g., captured identifiers 108), for example, include different forms of pointers that represent different components of a rendered scene such as virtual memory addresses, shader identifiers, descriptor handles, and the like. For example, when CPU 102 captures (e.g., stores) a workload 116 being performed by processing unit 126, the resulting captured workload 136 references captured identifiers 108 generated or used when processing unit 126 performed the workload 116. That is to say, the captured workload 136 includes captured identifiers 108 associated with (e.g., referenced by) a workload 116 at the time of capture (e.g., when CPU 102 stores the workload 116 to produce captured workload 136). In some embodiments, these identifiers are stored in one or more memory objects (e.g., regions of virtual memory) of the processing system 100. After capturing one or more workloads, the CPU then performs the optimization instructions of the reconstruction application. During the performance of the optimization instructions, the CPU modifies or adds one or more instructions, graphics calls, or both of the captured workloads so as to reduce the time needed for the processing unit to perform the captured workloads, reduce the processing unit resources needed to perform the captured workloads, or both. After the CPU has performed the optimization instructions, the CPU then performs the replay instructions of the reconstruction application. While performing the replay instructions, the CPU uploads one or more graphics calls of the stored workload to the processing unit which in turn performs the graphics calls to render one or more graphics objects.

According to embodiments, because the identifiers referenced by the graphics calls are stored as raw data within memory objects of the processing system 100, these memory objects including the identifiers are likely to change from the capture of the workload 116 to the replay of the captured workload 136 including the identifiers. That is to say, the identifiers referenced by the graphics calls of rendering application 114 executed by processing unit 126 at a first time differ from the identifiers referenced by the graphics calls executed by processing unit 126 at a second, later time. To this end, while CPU 102 is performing replay instructions 124, CPU 102 is configured to translate one or more captured identifiers 108 (e.g., identifiers captured when a workload 116 was captured) of a captured workload 136 to one or more runtime identifiers 138. These runtime identifiers 138, for example, represent identifiers generated or used by processing unit 126 when performing one or more instructions, graphics calls, or both of a captured workload 136.

To translate one or more captured identifiers 108 to runtime identifiers 138, CPU 102 includes identifier translation circuitry 106. Identifier translation circuitry 106, for example, includes circuitry configured to translate captured identifiers 108 to runtime identifiers 138 based on one or more translation methods. For example, identifier translation circuitry 106 is configured to issue one or more instructions, operations, or both to one or more processor cores 104. When performed by the processor cores 104, these instructions, operations, or both cause CPU 102 to translate captured identifiers 108 of a captured workload 136 to runtime identifiers 138. After translating captured identifiers 108 of a captured workload 136 to runtime identifiers 138, CPU 102 then provides the captured workload 136 with the runtime identifiers 138 to processing unit 126 for performance. In some embodiments, to translate captured identifiers 108 stored in a memory object 103 (e.g., virtual memory address region) of processing unit 126, CPU 102 first issues a translation call to processing unit 126. In response to receiving the translation command, processing unit 126 stops executing a current instruction and then makes data (e.g., contents) of a memory object 103 storing one or more identifiers available for download by CPU 102. CPU 102 then translates the identifiers by updating the contents of the memory object and uploads the modified memory object including the translated identifiers for the processing unit 126. After CPU 102 uploads the modified memory object, CPU 102 then uploads one or more graphics calls of the captured workload 136 for performance by processing unit 126. However, translating captured identifiers 108 to runtime identifiers 138 using such translation calls requires introducing a stall at processing unit 126 so that CPU 102 is able to download the data of a memory object 103 from processing unit 126, update the data of the memory object 103, and then upload the modified data of the memory object 103. Once CPU 102 uploads the modified data of the memory object 103, processing unit 126 is able to resume the performance graphics calls of a captured workload 136. Due to these translation calls, the amount of time needed for processing unit 126 to perform the captured workload 136 is increased, decreasing the processing efficiency of processing unit 126. Additionally, having processing unit 126 download and upload the data of memory blocks before performing a graphics calls increases the number of resources (e.g., registers, memory, processor cores 128) used by processing unit 126 to perform a captured workload 136, again decreasing the processing efficiency of processing unit 126.

To this end, according to some embodiments, CPU 102 (e.g., identifier translation circuitry 106) is configured to translate captured identifiers 108 indicating a memory object of processing unit 126 to runtime identifiers 138 before the data of a memory block is first uploaded for processing unit 126. For example, while performing optimization instructions 122, CPU 102 is configured to perform two translation passes. During a first translation pass, CPU 102 is configured to perform one or more instructions, operations, or both of captured workload 136. While performing these instructions or operations, CPU 102 is configured to track the locations of captured identifiers 108 that are stored in a memory object 103 (e.g., virtual memory address region) of processing unit 126. For example, CPU 102 first identifies one or more graphics calls of captured workload 136 that reference a captured identifier 108 stored in a memory object 103 of processing unit 126. After identifying a graphics call that references a captured identifier 108 stored in a memory object 103 of processing unit 126, CPU 102 tracks the location of the captured identifier 108 stored in a memory object 103 of processing unit 126 by, for example, determining one or more offsets associated with the captured identifier 108. These offsets, for example, indicate the position of a captured identifier 108 within the memory object 103 of the processing unit 126. Additionally, CPU 102 determines which command of captured workload 136 caused CPU 102 to upload data including the captured identifier 108 for processing unit 126. Further, in some embodiments, CPU 102 determines a timing for the captured identifier 108. A timing, for example, indicates when during a captured workload 136 a respective captured identifier 108 stored in a memory object 103 of processing unit 126 was copied to another memory object 103 of processing unit 126. As such, during the first translation pass, CPU 102 identifies one or more graphics calls referencing captured identifiers 108 stored in a memory object 103 of processing unit 126, one or more offsets for the captured identifiers 108, one or more commands that caused CPU 102 to upload data including the captured identifiers 108 for processing unit 126, and one or more timing associated with the captured identifiers 108.

During the second translation pass, CPU 102 generates and inserts one or more translation commands 110 into the captured workload 136 based on the graphics calls referencing captured identifiers 108 stored in a memory object 103 of processing unit 126, the offsets for the captured identifiers 108, the commands that caused CPU 102 to upload data including the captured identifiers 108 for processing unit 126, and the timings associated with the captured identifiers 108. For example, CPU 102 generates one or more translation commands 110 based on the identified commands that caused CPU 102 to upload data including the captured identifiers 108 and one or more offsets associated with the captured identifiers 108 identified during the first pass. Translation commands 110, for example, include instructions that, when performed by CPU 102, cause CPU 102 to translate captured identifiers 108 indicating a memory object of processing unit 126 to runtime identifiers 138 (e.g., identifiers used or generated when the captured workload 136 is performed by processing unit 126) by, for example, updating the command that caused CPU 102 to upload data (e.g., a parent memory object) including the captured identifiers 108. As an example, a translation command 110 includes data identifying the locations of one or more captured identifiers 108 within data to be uploaded based on the offsets associated with the captured identifiers 108. Based on the translation command 110, identifier translation circuitry 106 is configured to translate the captured identifiers 108 at the locations indicated in the translation command 110 to runtime identifiers 138. In embodiments, after generating a translation command 110 to translate one or more captured identifiers 108, CPU 102 inserts the translation command 110 for a captured identifier 108 into the captured workload 136 at a location based on the graphics calls associated with the captured identifier 108, the command that caused the CPU 102 to upload data including the captured identifier 108, the timing of the captured identifier 108, or any combination thereof. As an example, CPU 102 first identifies a graphics call block of captured workload 136 including the graphics call that referenced the captured identifier 108. CPU 102 then inserts the translation command 110 for a captured identifier 108 immediately before an upload block associated with the identified graphics call block. That is to say, for example, CPU 102 inserts the translation command 110 before the upload block that includes the command that causes CPU 102 to upload data including the captured identifier 108 for processing unit 126.

After inserting one or more translation commands 110 into a captured workload 136, CPU 102 then performs the replay instructions 124 of reconstruction application 118. While executing the replay instructions 124, in response to receiving a translation command 110 from the captured workload 136, CPU 102 is configured to perform the translation command 110 such that one or more captured identifiers 108 in data (e.g., a parent memory object) to be uploaded by an upload command are translated to runtime identifiers 138 (e.g., identifiers used to perform the captured workload 136). Once CPU 102 has performed the translation command 110, CPU 102 then uploads the data (e.g., the parent memory object) including the runtime identifiers 138 (e.g., translated identifiers) for processing unit 126, and then continues issuing graphics calls. Processing unit 126 then performs the graphics calls using the runtime identifiers 138 and renders one or more graphics objects. In this way, CPU 102 is configured to translate captured identifiers 108 indicating a memory object of processing unit 126 before the captured identifiers 108 are uploaded for processing unit 126. Because CPU 102 performs these translations before the identifiers are uploaded, processing unit 126 is no longer required to perform download and reupload operations to translate the identifiers, reducing the time needed for processing unit 126 to perform a captured workload 136, which helps to improve the processing efficiency of the system.

According to embodiments, processing system 100 further includes an input/output (I/O) engine 132. The I/O engine 132 includes hardware and software to handle input or output operations associated with the display 134, as well as other elements of the processing system 100 such as keyboards, mice, printers, external disks, and the like. The I/O engine 132 is coupled to the bus 140 so that the I/O engine 132 communicates with the memory 112, processing unit 126, or CPU 102.

Figure 2:
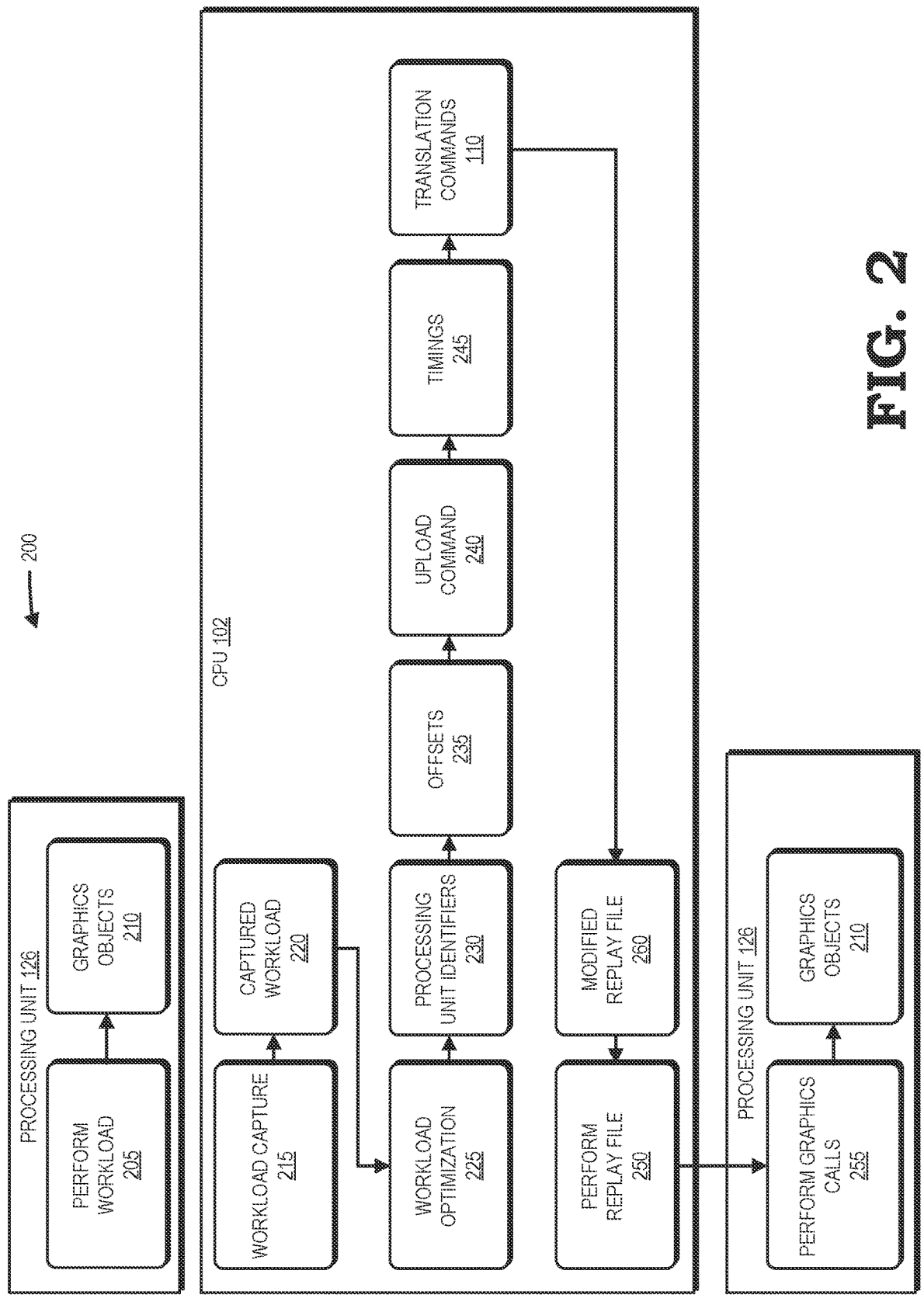
FIG. 2 is a signal flow operation of an example process for translating identifiers of a captured workload at a central processing unit (CPU) before upload, in accordance with some embodiments.

Referring now to FIG. 2, an example process 200 for translating identifiers of a captured workload at a CPU is presented. According to embodiments, example process 200 is performed by CPU 102, processing unit 126, or both while CPU 102 executes one or more instructions from reconstruction application 118. As an example, example process 200 is performed by CPU 102, processing unit 126, or both while CPU 102 executes capture instructions 120, optimization instructions 122, and replay instructions 124 of reconstruction application 118. In embodiments, example process 200 includes processing unit 126 performing a perform workload operation 205 to render one or more graphics objects 210. The perform workload operation 205, for example, includes processing unit 126 performing one or more instructions, graphics calls, or both of a workload 116 of a rendering application 114. As an example, according to some embodiments, CPU 102 is configured to store data indicating one or more instructions, graphics calls, or both of a workload 116 to one or more queues, buffers, portions of memory 112, or any combination thereof. In some embodiments, CPU 102 uploads such data as one or more data blocks. During perform workload operation 205, processing unit 126 then retrieves the data indicating one or more instructions, graphics calls, or both from the queues, buffers, or portions of memory 112 and performs the indicated instructions, graphics calls, or both so as to render one or more graphics objects 210.

Additionally, example process 200 includes CPU 102 performing workload capture operation 215. Workload capture operation 215 includes, for example, CPU 102 performing one or more of the capture instructions 120 of reconstruction application 118 to produce a captured workload 220 similar to or the same as captured workload 136. While performing workload capture operation 215, CPU 102 is configured to capture data representing the instructions, graphics calls, or both of a workload 116 provided by rendering application 114. As an example, CPU 102 generates and stores one or more instructions, graphics calls, or both of a workload 116 as one or more memory blocks in memory 112. For example, in embodiments, CPU 102 stores captured workload 220 as one or more graphics calls blocks and one or more associated upload blocks. Such graphics call blocks, for example, include data representing one or more graphics calls to be executed. Further, each upload block is associated with one or more corresponding graphics call blocks. An upload block, for example, includes data indicating a command that causes CPU 102 to upload data (e.g., identifiers) used or referenced by the graphics calls indicated in one or more associated graphics call blocks.

After CPU 102 performs workload capture operation 215, example process 200 includes CPU 102 performing workload optimization operation 225. Workload optimization operation 225 includes, for example, CPU 102 performing one or more optimization instructions 122 of reconstruction application 118 to produce a modified replay file 260 that includes the captured workload 220 and one or more translation commands 110. To this end, workload optimization operation 225 first includes CPU 102 performing one or more instructions, operations, or both of captured workload 220. While performing the instructions or operations of captured workload 220, CPU 102 identifies one or more graphics calls that reference (e.g., indirectly reference) a processing unit identifier 230. Such graphics calls, for example, represent one or more graphics calls issued by rendering application 114 for a workload 116. These graphics calls include, for example, one or more draw calls, state-setting calls, ray tracing calls, or any combination thereof, to name a few. Further, these processing unit identifiers 230, for example, each includes a captured identifier 108 stored in a memory object 103 (e.g., virtual memory address range) of processing unit 126. In embodiments, for one or more of the processing unit identifiers 230 referenced by a graphics call, CPU 102 is configured to track the location of the processing unit identifiers 230. For example, CPU 102 is configured to generate one or more offsets 235. These offsets 235, for example, each include one or more values indicating the position of a processing unit identifier 230 within the memory object 103 of the processing unit 126. Further, for each identified processing unit identifier 230, CPU 102 is configured to determine an associated upload command 240 stored in captured workload 220. The associated upload command 240, for example, causes CPU 102 to upload data including the processing unit identifier 230 for processing unit 126 such that processing unit 126 is able to perform the graphics call that references the processing unit identifier 230. Further, during workload optimization operation 225, once CPU 102 has identified one or more processing unit identifiers 230 referenced by a graphics call, CPU 102 determines a timing 245 the processing unit identifier 230s. Such a timing 245, for example, includes data indicating when, within captured workload 220, a processing unit identifier 230 is copied to another memory object 103 (e.g., virtual memory address) of processing unit 126. As an example, a timing 245 includes a point within captured workload 220 at which a respective processing unit identifier 230 stored in a first memory object 103 of processing unit 126 is copied to a second memory object 103 of processing unit 126.

Based on the identified processing unit identifiers 230 and associated offsets 235, CPU 102 is configured to generate one or more translation commands 110 each including instructions that, when performed by CPU 102, cause CPU 102 to translate a processing unit identifier 230 from a captured identifier 108 to a runtime identifier 138. For example, based on an identified processing unit identifier 230 and an associated offset 235, CPU 102 generates a translation command 110 indicating a location of the processing unit identifier 230 within data to be uploaded by an associated upload command 240. Further, the translation command 110 includes instructions that, when executed by CPU 102, cause CPU 102 to translate the identified processing unit identifier 230 at the indicated location from a captured identifier 108 to a runtime identifier 138. After generating a translation command 110, CPU 102 is then configured to insert the translation command 110 into captured workload 220 based on the graphics call, upload command 240, timings 245, or any combination thereof associated with the processing unit identifier identified by the translation command 110. As an example, CPU 102 stores a memory block representing a translation command 110 at a location within captured workload 220 based on the graphics call, upload command 240, or both associated with the processing unit identifier identified by the translation command 110. For example, CPU 102 stores the memory block representing the translation command 110 immediately before the upload blocks associated with the graphics call block including the graphics call that referenced the processing unit identifier 230. That is to say, CPU 102 stores the memory block representing the translation command 110 immediately before the upload blocks that cause CPU 102 to upload the processing unit identifier 230 for processing unit 126. Inserting the translation commands 110 into captured workload 220 produces a modified file also referred to herein as modified replay file 260.

In embodiments, example process 200 further includes CPU 102 performing perform replay file operation 250. Perform replay file operation 250, for example, includes CPU 102 executing one or more replay instructions 124 of reconstruction application 118 that, when executed by CPU 102, cause CPU 102 to upload data representing one or more instructions, graphics calls, or both of modified replay file 260 (e.g., a modified captured workload 220) to processing unit 126. For example, during perform replay file operation 250, CPU 102 is configured to retrieve memory blocks of modified replay file 260. In response to receiving a memory block including a translation command 110, CPU 102 is configured to translate one or more processing unit identifiers 230 in a subsequent memory block of modified replay file 260 (e.g., an upload block including the processing unit identifiers 230) to runtime identifiers 138 based on the translation command 110. For example, CPU 102 performs one or more instructions indicated in the translation command 110 so as to translate one or more processing unit identifiers 230 of a subsequent memory block of modified replay file 260 from captured identifiers 108 to runtime identifiers 138. After performing the translation command 110, CPU 102 then uploads data including the translated processing unit identifiers 230 such that the translated processing unit identifiers 230 are ready to be referenced by one or more graphics calls to be executed by processing unit 126. As an example, CPU 102 performs an upload command 240 as indicated in an upload block modified by a previous translation command 110 so as to upload the translated processing unit identifiers 230. CPU 102 then uploads data representing one or more graphics calls as indicated by one or more graphics call blocks associated with the upload block. As such, processing unit 126 has valid runtime memory objects available and is able to perform graphics call operation 255 based on the available data. Perform graphics call operation 255 includes processing unit 126 performing one or more instructions, operations, or both which results in the generation of the graphics objects 210. Because CPU 102 translated the processing unit identifiers 230, and subsequently uploaded them, processing unit 126 is able to safely perform instructions, operations, or both for these graphics calls using the translated processing unit identifier 230 (e.g., runtime identifiers 138).

Figure 3:
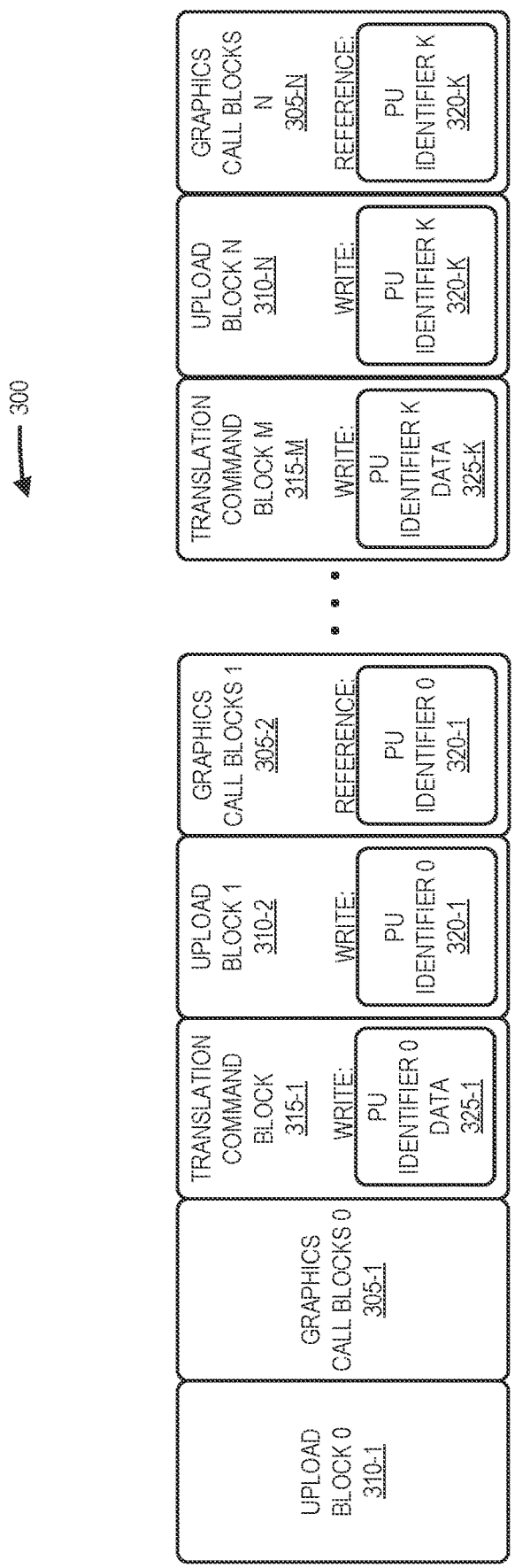
FIG. 3 is a block diagram of an example replay file including one or more translation commands, in accordance with some embodiments.

Referring now to FIG. 3, an example replay file 300 including one or more translation commands is presented, in accordance with some embodiment. Example replay file 300, for example, represents a captured workload 220 as modified by workload optimization operation 225, modified replay file 260, or both. According to embodiments, example replay file 300 includes one or more graphics call blocks 305, one or more upload blocks 310, and one or more translation command blocks 315. As an example, for one or more graphics calls indicated in a captured workload 220, example replay file 300 includes respective graphics call blocks 305 and an associated upload block 310. That is to say, captured workload includes one or more sets of graphics calls blocks 305 each indicating a respective graphics call and corresponding upload blocks 310 for each set of graphics call blocks 305. Each graphics call block 305, for example, includes data representing a graphics call that was previously issued by rendering application 114 for a workload 116 that was captured to produce a captured workload 220. Though the example embodiment of FIG. 3 presents example replay file 300 as including three sets of graphics call blocks (305-1, 305-2, 305-N) representing an N number of sets of graphics call blocks, in other embodiments, example replay file 300 can include any number of sets of graphics call blocks 305. In embodiments, for each set of graphics call block 305 in example replay file 300, example replay file 300 includes a respective upload block 310 immediately preceding the set of graphics call blocks 305. An upload block 310, for example, includes instructions that, when performed by CPU 102, cause CPU 102 to upload data (e.g., identifiers) used or referenced by the graphics calls indicated in an associated set of graphics call blocks 305. For example, an upload block 310 includes an upload command 240 to upload data used or referenced by graphics calls indicated in a set of graphics call blocks 305 immediately following the upload block 310. Though the example embodiment of FIG. 3 presents example replay file 300 as including three upload blocks (310-1, 310-2, 310-N) for three sets of graphics call blocks 305, in other embodiments, example replay file 300 can include any number of upload blocks 310 each associated with any number of graphics call blocks 305.

According to embodiments, one or more graphics calls indicated in a set of graphics call blocks 305 reference one or more processing unit identifiers 230 (e.g., identifiers stored in a memory object 103 of processing unit 126). Referring to the example embodiment presented in FIG. 3, these processing unit identifiers are represented as PU identifier 0 320-1 and PU identifier K 320-1. For each set of graphics call blocks 305 including graphics calls referencing a PU identifier 320, example replay file 300 includes a corresponding translation command block 315. Each translation command block 315, for example, includes a translation command 110 that, when executed by CPU 102, translates the processing unit identifiers 230 (e.g., PU identifiers 320) within the upload block 310 associated with the set of graphics call blocks 305 including the graphics calls that reference the processing unit identifiers 230. As an example, a translation command 110 includes PU identifier data (325-1, 325-K) indicating the location of one or more PU identifiers 320 within data to be uploaded (e.g., a parent memory object) by an upload block 310. Further, the translation command 110 includes instructions that cause CPU 102 to translate the PU identifiers 320 within a subsequent (e.g., immediately subsequent) upload block 310 at the locations indicated by the PU identifier data 325.

After the instructions indicated in a translation command block 315 have been executed, CPU 102 performs an upload command 240 as indicated by an immediately subsequent upload block 310 such that CPU 102 uploads the translated PU identifiers 320. Once the upload command 240 is performed, CPU 102 uploads data indicating the graphics calls indicated in the subsequent set of graphics call blocks 305. In this way, when data is uploaded by CPU 102 during an associated upload block 310, the uploaded data includes translated processing unit identifiers 230 (e.g., runtime identifiers 138). Because the uploaded data includes translated processing unit identifiers 230, processing unit 126 is able to use these processing unit identifiers 230 when performing instructions and operations for the graphics calls of a subsequent set of graphics call blocks 305, reducing the time needed for processing unit 126 to render graphics objects 210 when replaying a captured workload 220. Though the example embodiment of FIG. 3 presents example replay file 300 as including two translation command blocks (315-1, 315-M) representing an M number of translation command blocks, in other embodiments, example replay file 300 can include any number of translation command blocks 315.

Figure 4:
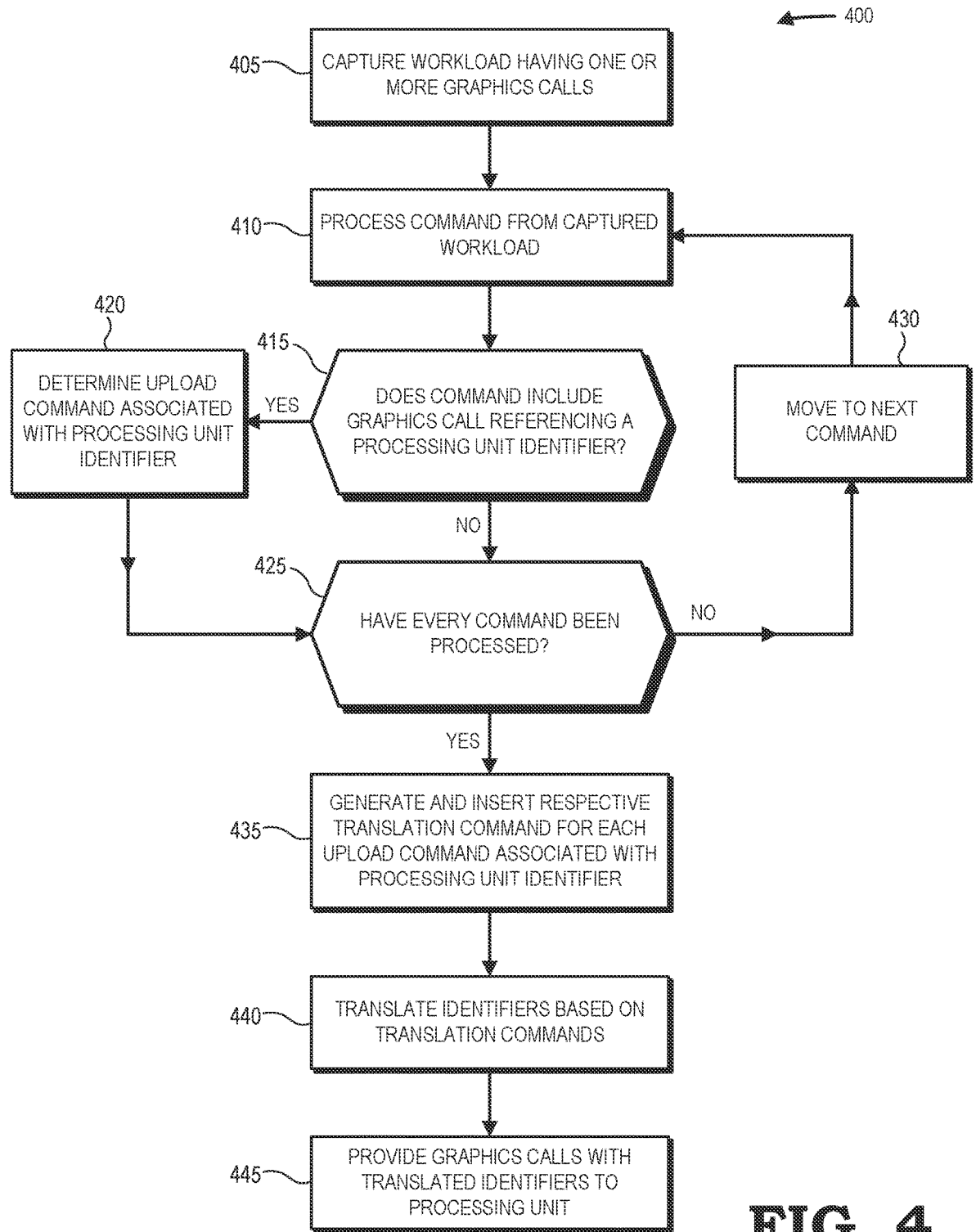
FIG. 4 is a flow diagram of an example method for translating identifiers of a captured workload at a CPU before upload, in accordance with some embodiments.

Referring now to FIG. 4, an example method 400 for translating processing unit identifiers at a CPU is presented, in accordance with some embodiments. At block 405 of example method 400, CPU 102 first captures a workload 116 including one or more graphics calls. For example, CPU 102 copies data indicating a workload 116 including one or more graphics calls provided from a rendering application 114 to produce a captured workload 220. In embodiments, CPU 102 is configured to capture a workload 116 provided from rendering application 114 concurrently with processing unit 126 performing one or more instructions, operations, or both for the workload 116. In embodiments, CPU 102 is configured to store captured workload 116 as one or more sets of graphics call blocks 305 each associated with a respective upload block 310. Further, according to some embodiments, CPU 102 is configured to store captured workload 116 such that an upload block 310 is disposed immediately before an associated set of graphics call blocks 305 within captured workload 220. At block 410, CPU 102 is configured to process (e.g., execute) one or more commands, instructions, or both of captured workload 220. That is to say, CPU 102 begins executing captured workload 220. While processing captured workload 220, at block 415, CPU 102 is configured to determine if a command being executed includes a graphics call that references a processing unit identifier 230. That is to say, CPU 102 determines whether a command includes a graphics call referencing a captured identifier 108 stored in a memory object 103 of processing unit 126. In response to the graphics call of the command referencing a processing unit identifier 230, at block 420, CPU 102 determines the upload command 240 that caused CPU 102 to upload data including the processing unit identifier 230 (e.g., a captured identifier 108 to be stored in a memory object 103 of processing unit 126) for processing unit 126. That is to say, CPU 102 determines the upload command 240 that uploaded the captured identifier 108 referenced by the graphics call. After determining the upload command 240, CPU 102 moves to block 425. Further, referring again to block 415, based on the graphics call not referencing a processing unit identifier 230 (e.g., not referencing a captured identifier 108 stored in a memory object 103 of processing unit 126), CPU 102 moves to block 425.

At block 425, CPU 102 determines whether every command of the captured workload 220 has been processed (e.g., executed). Based on one or more commands of the captured workload not having yet been processed, CPU 102, at block 430, moves to a next command of the captured workload 220. CPU 102 then, at block 410 then processes the next command. Referring again to block 425, based on all the commands of the captured workload 220 having been processed, CPU 102 moves on to block 435. At block 435, for each upload command 240 identified at block 420, CPU 102 generates a respective translation command 110. As an example, CPU 102 generates a translation command 110 based on offsets 235 associated with one or more processing unit identifiers 230 associated with the identified upload command 240. Each translation command 110, for example, indicates the location of one or more processing unit identifiers 230 within the data to be uploaded (e.g., parent memory object) by an associated upload command 240. Further, each translation command 110 includes instructions that, when executed by CPU 102, cause CPU 102 to translate the identifiers (e.g., captured identifiers 108) at locations indicated in the translation command 110 to runtime identifiers 138. For example, CPU 102 updates the data to be uploaded so as to translate the processing unit identifiers 230. In embodiments, after generating a translation command 110, CPU 102 then inserts the translation command 110 into captured workload 220 based on the upload command 240 associated with the translation command 110 (e.g., the upload command 240 the translation command 110 is configured to translate). As an example, CPU 102 inserts the translation command immediately before the upload block 310 including the upload command 240 associated with the translation command 110. After inserting a respective translation command 110 for each upload command 240 identified at block 420, CPU 102 produces a modified replay file 260.

At block 440, CPU 102 begins executing modified replay file 260. While executing modified replay file 260, in response to receiving a translation command block 315, CPU 102 is configured to translate the processing unit identifier 230 from captured identifiers 108 to runtime identifiers 138 in data (e.g., a parent memory object) to be uploaded by an upload command 240 in a subsequent upload block 310 (e.g., upload block 310 immediately following the translation command block 315). For example, CPU 102, based on a translation command 110 in the inserted translation command block 315, translates the processing unit identifiers 230 in the data to be uploaded as indicated by a subsequent upload block 310. Once the data indicated in the upload block 310 is translated, CPU 102 performs the upload command 240 indicated in the upload block 310 and uploads data including the translated processing unit identifiers 230 for processing unit 126. At block 445, CPU 102 then issues one or more graphics calls indicated in a set of graphics call blocks 305 to processing unit 126. In response to receiving the graphics calls, processing unit 126 performs the graphics calls using the translated processing unit identifiers 230.

In some embodiments, the apparatus and techniques described above are implemented in a system including one or more integrated circuit (IC) devices (also referred to as integrated circuit packages or microchips), such as the CPU described above with reference to FIGS. 1-4. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer readable storage medium may include any non-transitory storage medium, or combination of non-transitory storage media, accessible by a computer system during use to provide instructions and/or data to the computer system. Such storage media can include but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system, including:
   a processor including one or more processor cores, the one or more processor cores configured to:
   capture a workload indicating an identifier stored in a memory object of a processing unit; and
   insert a translation command associated with the identifier in the captured workload based on a graphics call of the captured workload referencing the identifier.

2. The system of claim 1, wherein the one or more processor cores are configured to:
   generate the translation command based on an offset associated with the identifier stored in the memory object of the processing unit.

3. The system of claim 1, wherein the one or more processor cores are configured to:
   translate the identifier in the captured workload based on the inserted translation command to produce a translated identifier.

4. The system of claim 3, wherein the one or more processor cores are configured to:
   provide the translated identifier for the processing unit, wherein the processing unit is configured to render a graphics object based on the translated identifier.

5. The system of claim 1, wherein the processing unit is configured to perform the workload to render one or more graphics objects.

6. The system of claim 5, wherein the one or more processor cores are configured to capture the workload concurrently with the processing unit performing the workload.

7. The system of claim 1, wherein the one or more processor cores are configured to:
   insert the translation command at a location in the captured workload based on an upload command of the captured workload associated with the identifier stored in the memory object of the processing unit.

8. A method, comprising:
   capturing a workload indicating an identifier stored in a memory object of a processing unit from a rendering application; and
   inserting, by a processor, a translation command associated with the identifier in the captured workload based on a graphics call of the captured workload referencing the identifier.

9. The method of claim 8, further comprising:
   generating, at the processor, the translation command based on an offset associated with the identifier stored in the memory object of the processing unit.

10. The method of claim 8, wherein the translation command is inserted at a location in the captured workload based on an upload command of the captured workload associated with the identifier stored in the memory object of the processing unit.

11. The method of claim 8, further comprising:
    translating, at the processor, the identifier in the captured workload based on the inserted translation command to produce a translated identifier.

12. The method of claim 11, further comprising:
    providing the translated identifier for the processing unit, wherein the processing unit is configured to render a graphics object based on the translated identifier.

13. The method of claim 8, wherein the processing unit is configured to perform the workload to render one or more graphics objects.

14. The method of claim 13, further comprising:
capturing the workload concurrently with the processing unit performing the workload.

15. A processor, comprising:
one or more processor cores; and
identifier translation circuitry configured to:
translate one or more identifiers stored in a memory object of a processing unit of a captured workload based on one or more translation commands in the captured workload to produce one or more translated identifiers, the one or more translation commands in respective blocks within the captured workload each adjacent to a corresponding upload command block associated with at least one identifier of the one or more identifiers; and
upload data representing the one or more translated identifiers and one or more graphics calls of the captured workload associated with the translated one or more identifiers to the processing unit.

16. The processor of claim 15, wherein the identifier translation circuitry is configured to:
insert the one or more translation commands into the captured workload based on the graphics calls of the captured workload associated with the one or more identifiers.

17. The processor of claim 15, wherein the processing unit is configured to render a graphics object based on the data representing the one or more translated identifiers and one or more graphics calls of the captured workload associated with the one or more translated identifiers to the processing unit.

18. The processor of claim 15, wherein the one or more processor cores are configured to capture the workload concurrently with the processing unit performing the workload.

19. The processor of claim 15, wherein the identifier translation circuitry is configured to generate the one or more translation commands based on one or more offsets associated with the one or more identifiers.

20. The processor of claim 15, wherein the captured workload includes one or more graphics call blocks each referencing at least one identifier of the one or more identifiers.

* * * * *